US006972403B2

(12) United States Patent
Martenson et al.

(10) Patent No.: US 6,972,403 B2
(45) Date of Patent: Dec. 6, 2005

(54) POSITION ENCODER

(75) Inventors: David D. Martenson, Oregon City, OR (US); David L. Knierim, Wilsonville, OR (US)

(73) Assignee: Xerox Corporation, Stamford, CT (US)

(*) Notice: Subject to any disclaimer, the term of this patent is extended or adjusted under 35 U.S.C. 154(b) by 169 days.

(21) Appl. No.: 10/608,918

(22) Filed: Jun. 26, 2003

(65) Prior Publication Data

US 2005/0006574 A1 Jan. 13, 2005

(51) Int. Cl.[7] ............ G01D 5/34; H01J 3/14; H01J 40/14; H01J 5/16

(52) U.S. Cl. ............ 250/231.13; 250/237 R; 356/617; 347/37; 347/104

(58) Field of Search ............ 250/231.13–231.18, 250/237 R, 237 G; 347/37, 104; 400/279; 356/614, 616–617; 33/1 N, 1 PT; 359/227–236

(56) References Cited

U.S. PATENT DOCUMENTS

| | | | | | |
|---|---|---|---|---|---|
| 4,300,039 | A | | 11/1981 | Avins | 235/92 |
| 4,308,500 | A | | 12/1981 | Avins | 328/133 |
| 4,948,968 | A | * | 8/1990 | Matsui | 250/237 G |
| 4,963,733 | A | | 10/1990 | Spaulding | 250/231 |
| 5,017,776 | A | * | 5/1991 | Loewen | 250/231.14 |
| 5,021,781 | A | | 6/1991 | Salazar et al. | 341/13 |
| 5,063,291 | A | | 11/1991 | Buehring | 250/231 |
| 5,138,154 | A | | 8/1992 | Hotelling | 250/231 |
| 5,274,229 | A | * | 12/1993 | Khan | 250/231.18 |
| 5,455,604 | A | * | 10/1995 | Adams et al. | 346/138 |
| 5,563,591 | A | * | 10/1996 | Jacobs et al. | 341/13 |
| 5,600,352 | A | * | 2/1997 | Knierim et al. | 347/40 |
| 5,604,345 | A | | 2/1997 | Matsurra | |
| 5,929,789 | A | * | 7/1999 | Barbehenn | 341/11 |
| 6,140,636 | A | | 10/2000 | Norton et al. | 250/231 |
| 6,292,117 | B1 | | 9/2001 | Smith | 341/115 |
| 6,360,449 | B1 | | 3/2002 | Steentjes | 33/613 |
| 6,437,324 | B1 | | 8/2002 | Braun et al. | 250/231 |
| 6,713,756 | B2 | * | 3/2004 | Yamamoto et al. | 250/231.13 |
| 2002/0014581 | A1 | | 2/2002 | Yamamoto et al. | |
| 2004/0155178 | A1 | * | 8/2004 | Ito | 250/231.13 |

FOREIGN PATENT DOCUMENTS

| | | | | | |
|---|---|---|---|---|---|
| JP | 55012403 | A | * | 1/1980 | G01D 5/36 |
| JP | 2004239825 | A | * | 8/2004 | G01D 5/34 |

OTHER PUBLICATIONS

U.S. Appl. No. 10/342,483, Inventors: David D. Martenson and David L. Knierim; Filing Date: Jan. 15, 2003.

Agilent HEDS-9202 Two Channel Optical Incremental Encoder Modules 200 LPI Analog Output Data Sheet; Jul. 26, 2002; Agilent Technologies.

* cited by examiner

*Primary Examiner*—Stephone B. Allen
*Assistant Examiner*—Suezu Ellis
(74) *Attorney, Agent, or Firm*—Manuel Quiogue

(57) ABSTRACT

An optical encoder that includes an optical grating and a quadrature optical encoder sensor that move relative to each other. The optical grating includes a first encoder bar and a plurality of second encoder bars, wherein the first encoder bar is optically configured to change an amplitude of an output of the quadrature optical encoder sensor.

9 Claims, 9 Drawing Sheets

POSITION ENCODER

BACKGROUND OF THE DISCLOSURE

Printing systems such as ink jet printers and electrophotographic printers can employ position encoders to track the position of moving components such as print drums and printheads. Position encoders commonly include an optical grating and an optical encoder sensor that move relative to each other pursuant to movement of the component whose position is being tracked. It can be useful to determine a reference or home position for the component whose position is being tracked, and it can be difficult to determine such reference or home position.

DETAILED DESCRIPTION OF THE DISCLOSURE

Figure 1:
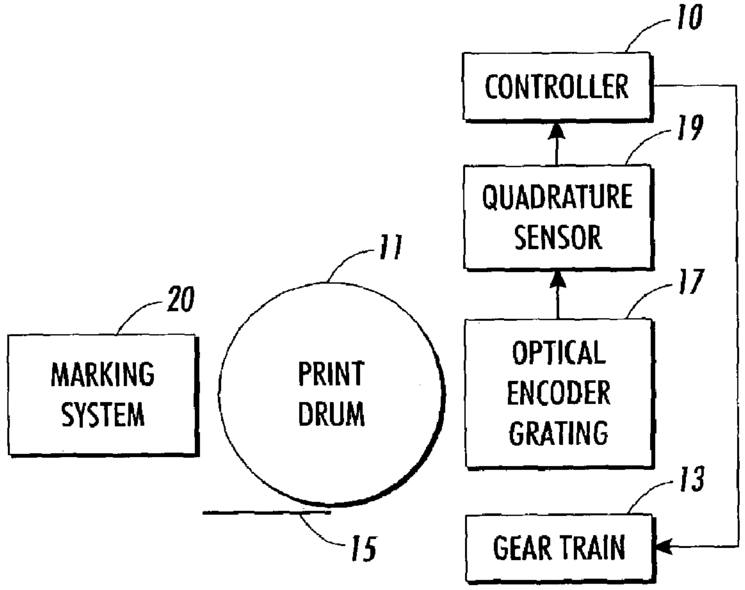
FIG. 1 is a schematic block diagram of an embodiment of a printing apparatus.

FIG. 1 is a schematic block diagram of an embodiment of a printing apparatus that includes a print drum 11 that is driven by a gear train 13, for example. A marking system 20 applies marking material to the print drum 11 to form an image that is transferred to a print output medium 15. The marking system 20 can be an ink jet marking system or an electrophotographic marking system, for example.

An optical encoder system comprised of an optical encoder grating 17 and a quadrature optical encoder sensor 19 that move relative to each other pursuant to movement of the print drum 11 provide position related information that can be processed by a printer controller 10, for example, to determine angular position of the print drum 11. By way of illustrative example, the optical encoder sensor 19 can be mechanically coupled to the print drum 11 or the gear train 13, or the optical encoder grating 17 can be mechanically coupled to the print drum 11 or the gear train 13. The optical encoder grating 17 includes an optical track that is encoded to identify a predetermined position of the print drum 11. The optical track can generally comprise a series of alternating light and dark regions or areas, wherein the light areas can be reflective or transmissive. In a transmissive system, the light areas would be transmissive while the dark areas would be less transmissive than the light areas. In a reflective system, the light areas would be reflective while the dark areas would be less reflective that the light areas.

For convenience, since the optical tracks disclosed herein can include areas of relative lightness or darkness, when an area is described as being lighter than another area, the lighter area is configured to be more transmissive in a transmissive system or more reflective in a reflective system. Similarly, when an area is described as being darker than another area, the darker area is configured to be less transmissive in a transmissive system or less reflective in a reflective system. Light areas can also be called spaces, slots or windows since they separate dark areas. Dark areas can be conveniently called encoder bars.

By way of illustrative example, the quadrature optical encoder sensor 19 can include a light source or emitter such as an LED and a plurality of photodetectors such as photodiodes for detecting the pattern of light transmitted or reflected by the optical track of the optical encoder grating as it moves through a sense region. The optical encoder sensor 19 can be implemented by an Agilent HEDS-9202 optical incremental encoder module that is available from Agilent Technologies, Inc. The optical track of the optical grating 17 modulates the light provided by the light source, and the quadrature optical encoder sensor 19 senses the light and dark areas of the optical track by detecting the modulated light provided by the optical track. The output of the quadrature optical encoder sensor 19 can comprise quadrature waveforms that can be provided to the controller 10 to control the operation of the gear train 13.

Figure 2:
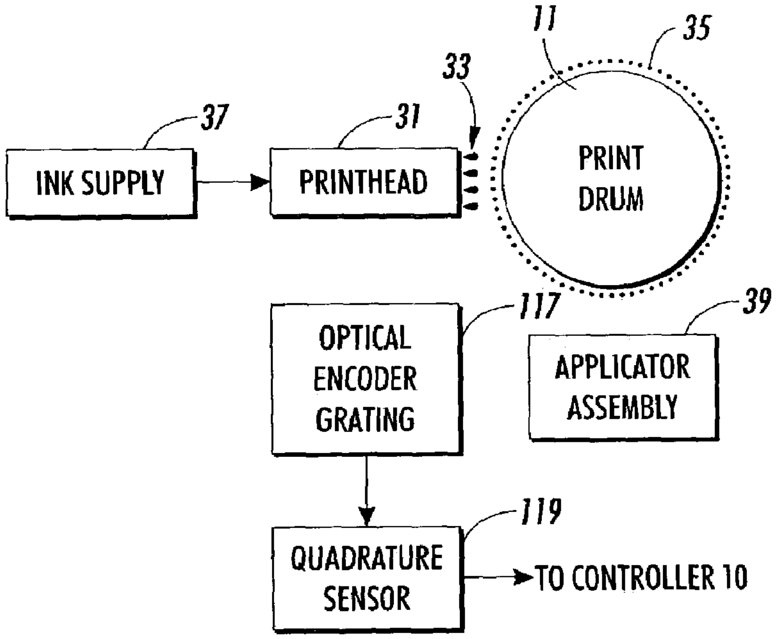
FIG. 2 is a schematic block diagram of an embodiment of a marking apparatus that can be used in the printing apparatus of FIG. 1.

FIG. 2 is a schematic block diagram of an embodiment of a marking system that includes an ink jet printhead 31 that deposits drops 33 of ink on an intermediate transfer surface 35 that is disposed on the print drum 11. The ink drops 33 can be melted solid ink that is provided by a supply 37 of solid ink. The intermediate transfer surface 35 comprises for example a liquid layer that is applied to the print drum 11 by an applicator assembly 39 that can include an oil impregnated roller and a metering wiper or blade, for example as shown in commonly assigned. U.S. Pat. No. 6,431,703. A linear optical encoder grating 117 and a quadrature optical encoder sensor 119 can be provided to detect the position of the printhead 31. The linear optical encoder grating 117 can move with movement of the printhead 31, or the quadrature optical encoder sensor can move with movement of the printhead 31.

Figure 3:
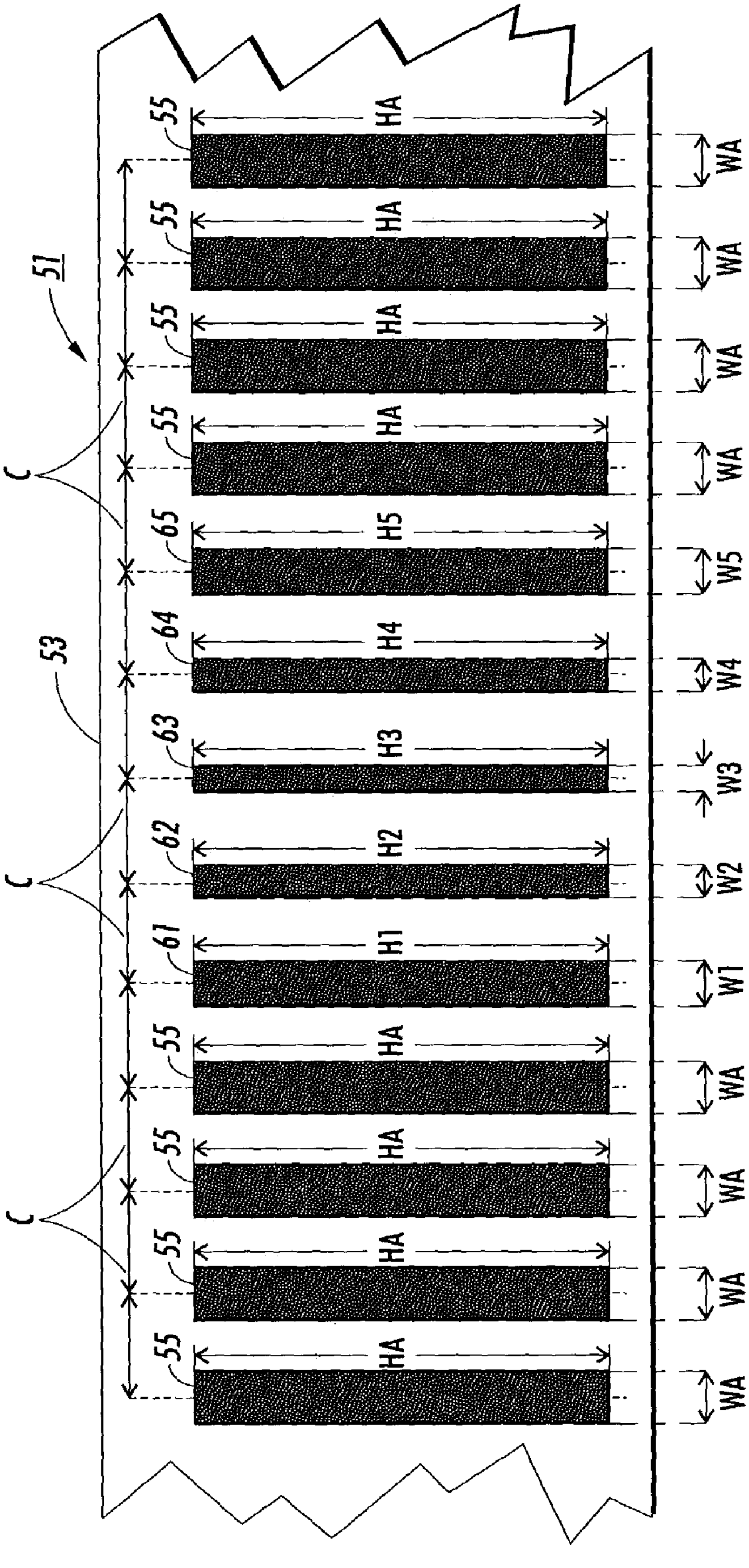
FIG. 3 is a schematic illustration of an embodiment of a linear optical grating.
Figure 4:
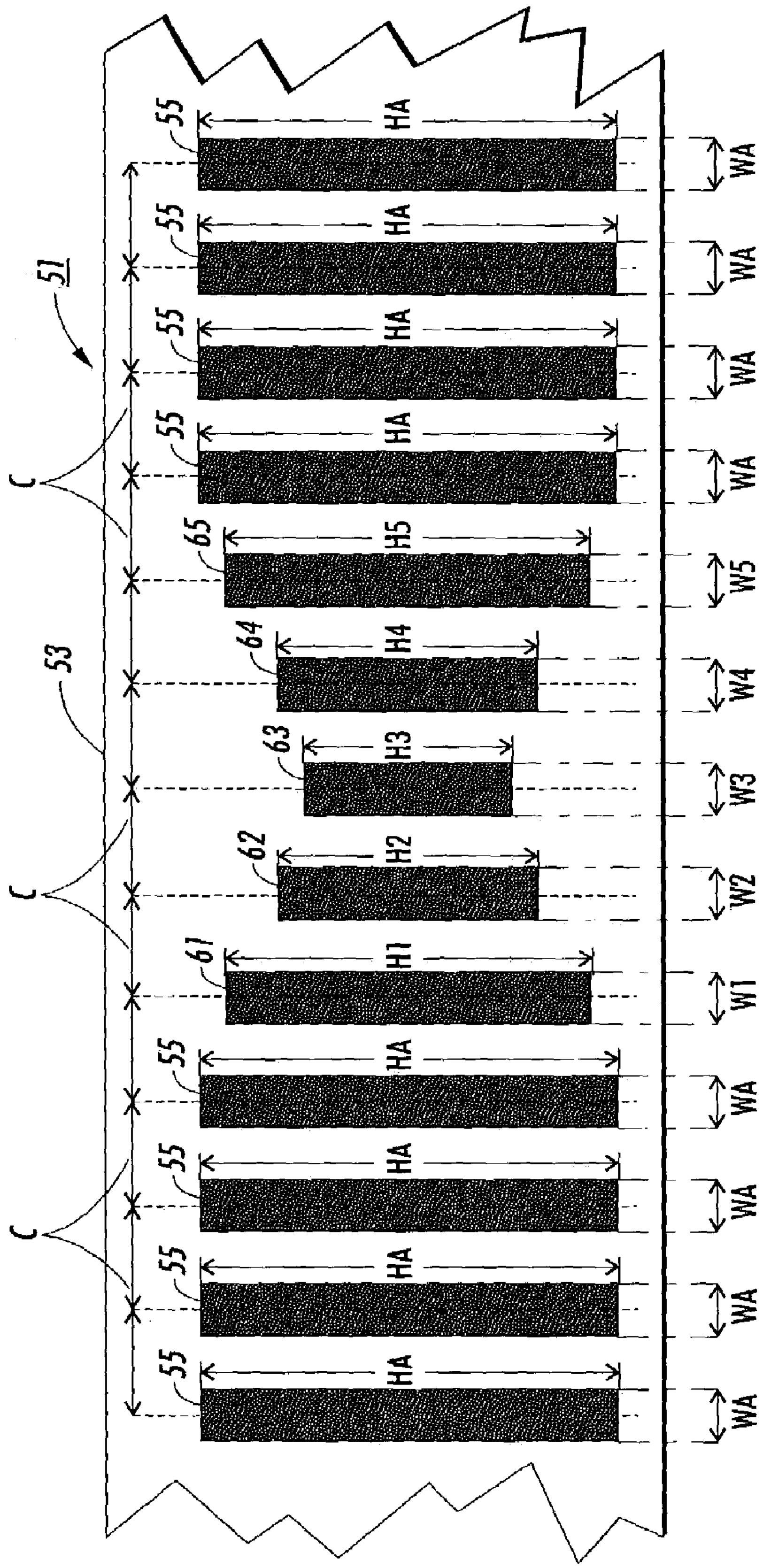
FIG. 4 is a schematic illustration of an embodiment of another linear optical grating.
Figure 5:
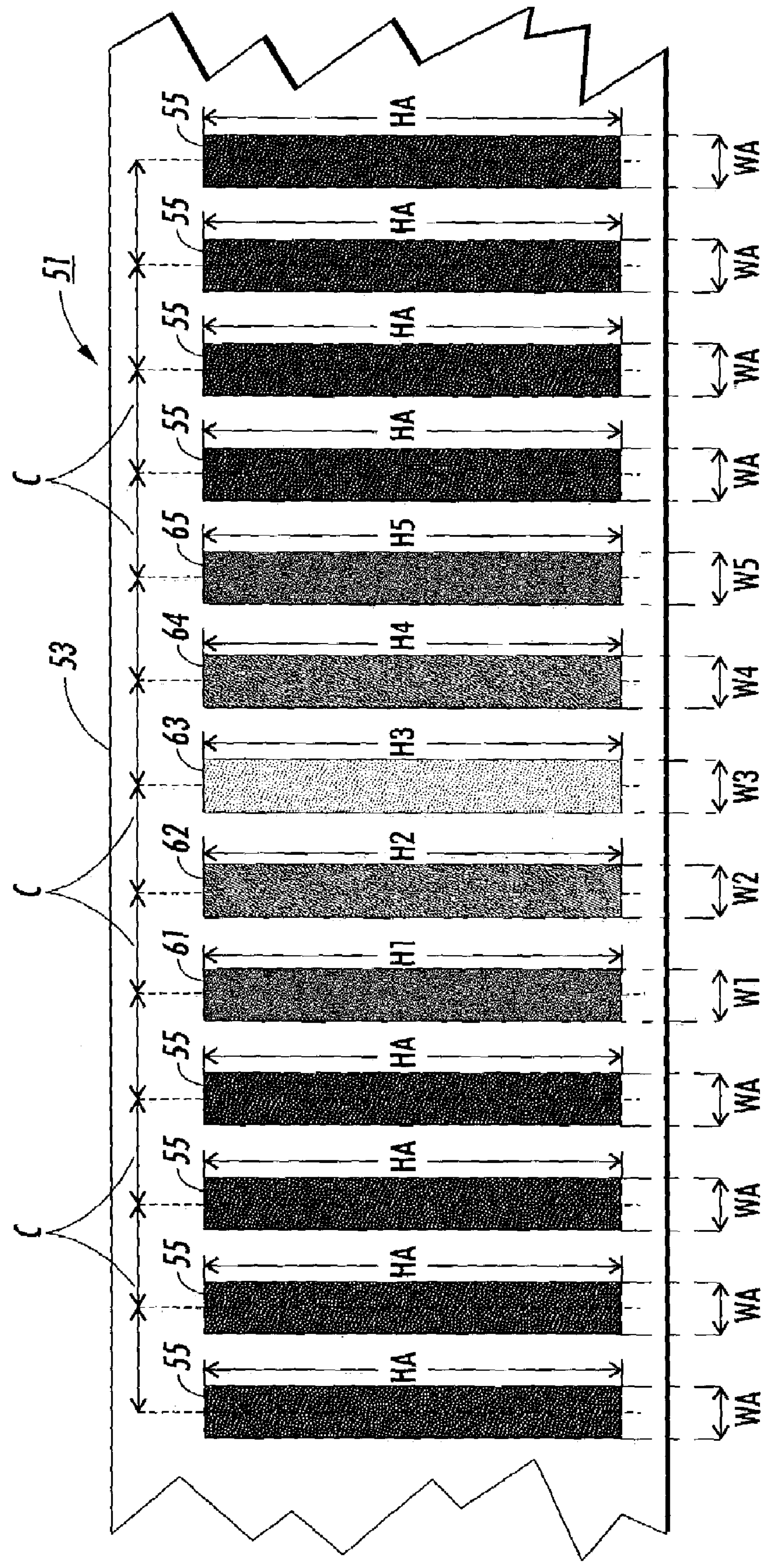
FIG. 5 is a schematic illustration of an embodiment of a further linear optical grating.
Figure 8:
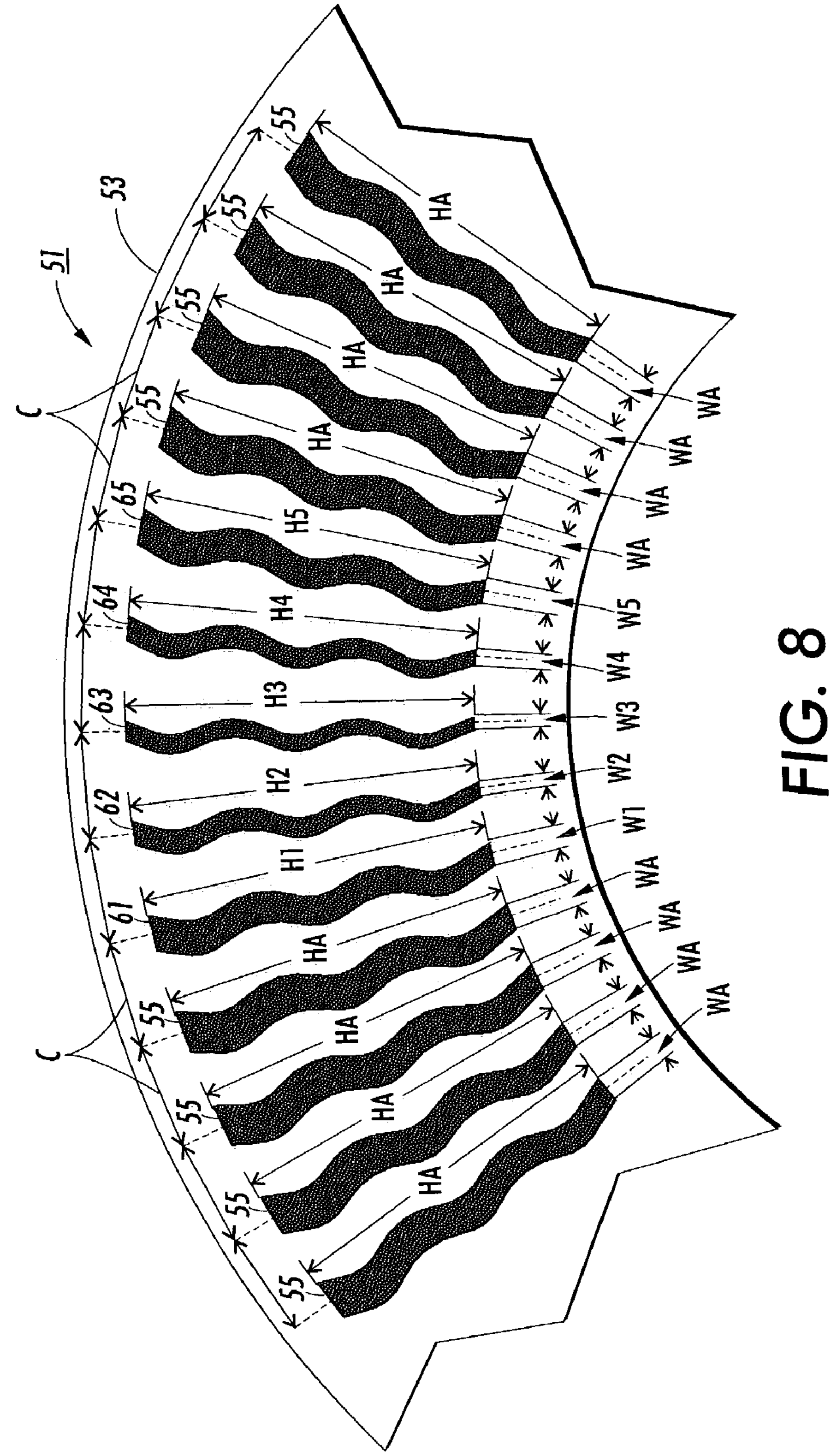
FIG. 8 is a schematic illustration of an embodiment of another circular optical grating.

FIGS. 3, 4 and 5 schematically illustrate embodiments of an optical encoder grating that includes a linear optical track 51 disposed on a linearly translatable strip 53. The optical track includes dark areas or bars 55, 61, 62, 63, 64, 65 that can be uniformly linearly spaced center to center C so as to have a constant pitch. The dark areas 61–65 are contiguously adjacent, and dark areas 55 can be on one or both sides of the dark areas 61–65. The dark areas 55, 61–65 can be rectangular, each having a width WA W1–W5 and a height HA, H1–H5. The side edges of the dark areas can be linear, or they can be non-linear as schematically illustrated in FIG. 8 for a circular optical track.

Each of the dark areas 55, 61–65 can be black, a non-black shade of gray, or patterned, for example. Suitable patterns can include line segments, dots, or rectangles.

The contiguously adjacent dark areas 61–65 are more particularly optically different from the dark areas 55 which can be optically substantially identical, such that the quadrature output waveforms of the quadrature sensor 119 change in amplitude when the dark areas 61–65 are sensed by the quadrature sensor 119. In other words, the dark areas 61–65 are configured to modulate the light sensed by the quadrature sensor 119, (FIG. 2) so that the quadrature waveforms change in amplitude. Such change can be detected to indicate a particular linear position of the optical grating 117 (FIG. 2) and thus a particular linear position of the printhead 31 (FIG. 2), for example. Alternatively, a single optically different dark area can be employed instead of a plurality of contiguously adjacent optically different dark areas 61–65, for example wherein the dark area 63 is the sole dark area that is optically different from the dark areas 55, 61–62 and 64–65.

For example, as schematically depicted in FIG. 3, the dark areas 61–65 can be narrower than the dark areas 55 which can be of substantially identical width. Alternatively, the dark areas 61–65 can be wider than the dark areas 55 which can be of substantially identical width. In these implementations the heights HA, H1–H5 of the dark areas 55, 61–65 can be substantially the same.

As another example, as schematically depicted in FIG. 4, the dark areas 61–65 can be shorter than the dark areas 55, wherein the dark areas 55, 61–65 can be of substantially the same width, and wherein the heights of the dark areas 61–65 are less than the height of the field of view of the quadrature optical encoder sensor 119. That is, the heights of the dark areas 55, 61–65 are configured such that the quadrature optical encoder can see the differences in height. As yet another example, the heights of the dark areas 61–65 can be greater than the heights of the dark areas 55 which can be of substantially identical height.

As yet another example, as schematically depicted in FIG. 5, the dark areas 61–65 can be of lighter shades of gray than the dark areas 55 which can be of substantially the same shade of gray, such that the dark areas 61–65 have greater reflectance in a reflective system or greater transmissivity in a transmissive system. Alternatively, the dark areas 61–65 can be of darker shades of gray than the dark areas 55 so as to have less reflectance in a reflective system or less transmissivity in a transmissive system. Also, dark areas 61–65 can have a different pattern or patterns than the dark areas 55, such that the dark areas 61–65 can have a greater reflectance (in a reflective system) or transmissivity (in a transmissive system) than the dark areas 55, or less reflectance (in a reflective system) or transmissivity (in a transmissive system) than the dark areas 55. In these implementations, the heights HA, H1–H5 can be substantially the same and/or the widths WA, W1–W5 can be substantially the same.

Figure 6:
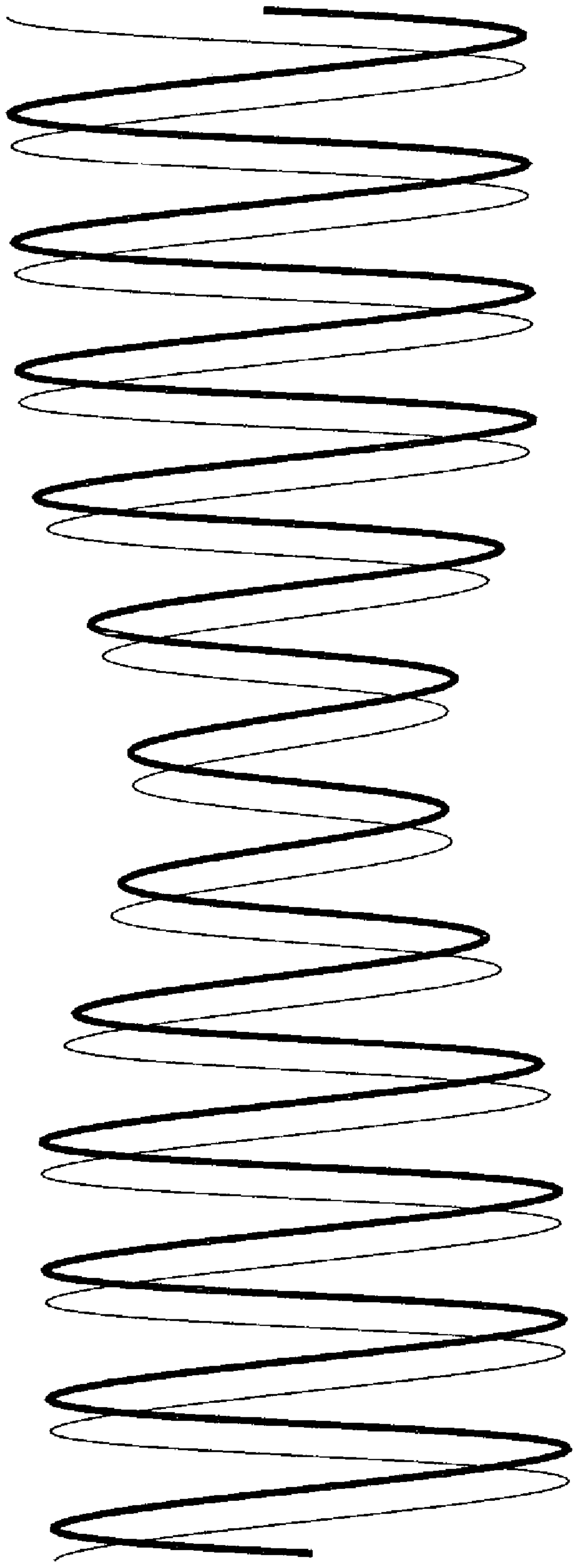
FIG. 6 sets forth schematic quadrature waveforms that would be produced as the linear optical track of FIG. 3, FIG. 4 or FIG. 5 moves between the emitter and the detectors of the quadrature optical encoder sensor of FIG. 2.

FIG. 6 sets forth schematic quadrature waveforms that would be produced as the optical track of FIG. 3, FIG. 4 or FIG. 5 moves between the emitter and the detectors of the quadrature optical encoder sensor 119.

The foregoing concepts regarding the optical characteristics of encoder bars can be implemented in an encoder wheel or disc, for example as schematically illustrated in FIGS. 7, 8, 9 and 10. An encoder wheel or disc can be employed for example to detect the position of a rotatable print drum 11 (FIG. 1).

FIGS. 7, 8, 9 and 10 are schematic illustrations of embodiments of an optical encoder grating that includes a circular optical track 51 disposed on a rotatable disc 53. The optical track 51 includes dark areas or bars 55, 61, 62, 63, 64, 65 disposed about the center of the optical track 51. The dark areas 55, 61–65 of the track can be uniformly angularly spaced center to center C so as to have a constant pitch. The dark areas 61–65 are contiguously adjacent, and dark areas 55 can be on one or both sides of the dark areas 61–65. Each of the dark areas 55, 61–65 has an angular width WA, W1–W5 and a radial height HA, H1–H5. The sides of the dark areas can be linear or they can be non-linear as schematically represented in FIG. 8. By way of specific example, the dark areas 55, 61–65 can comprise truncated circular sections or wedges.

Each of the dark areas 55, 61–65 can be black, a non-black shade of gray, or patterned, for example. Suitable patterns can include line segments, dots, or rectangles.

The contiguously adjacent dark areas 61–65 are more particularly optically different from the dark areas 55 which are optically substantially identical, such that the quadrature output waveforms of the quadrature optical encoder sensor 19 (FIG. 1) change in amplitude when the dark areas 61–65 are sensed by the quadrature optical encoder sensor 19. In other words, the dark areas 61–65 are configured to modulate the light sensed by the quadrature optical encoder sensor 19 so that the quadrature waveforms change in amplitude. Such change can be detected to indicate a particular angular position of the optical grating 17 (FIG. 1) and thus a particular angular position of the print drum 11 (FIG. 1), for example. Alternatively, a single optically different dark area can be employed instead of a plurality of contiguously adjacent optically different dark areas 61–65.

Figure 7:
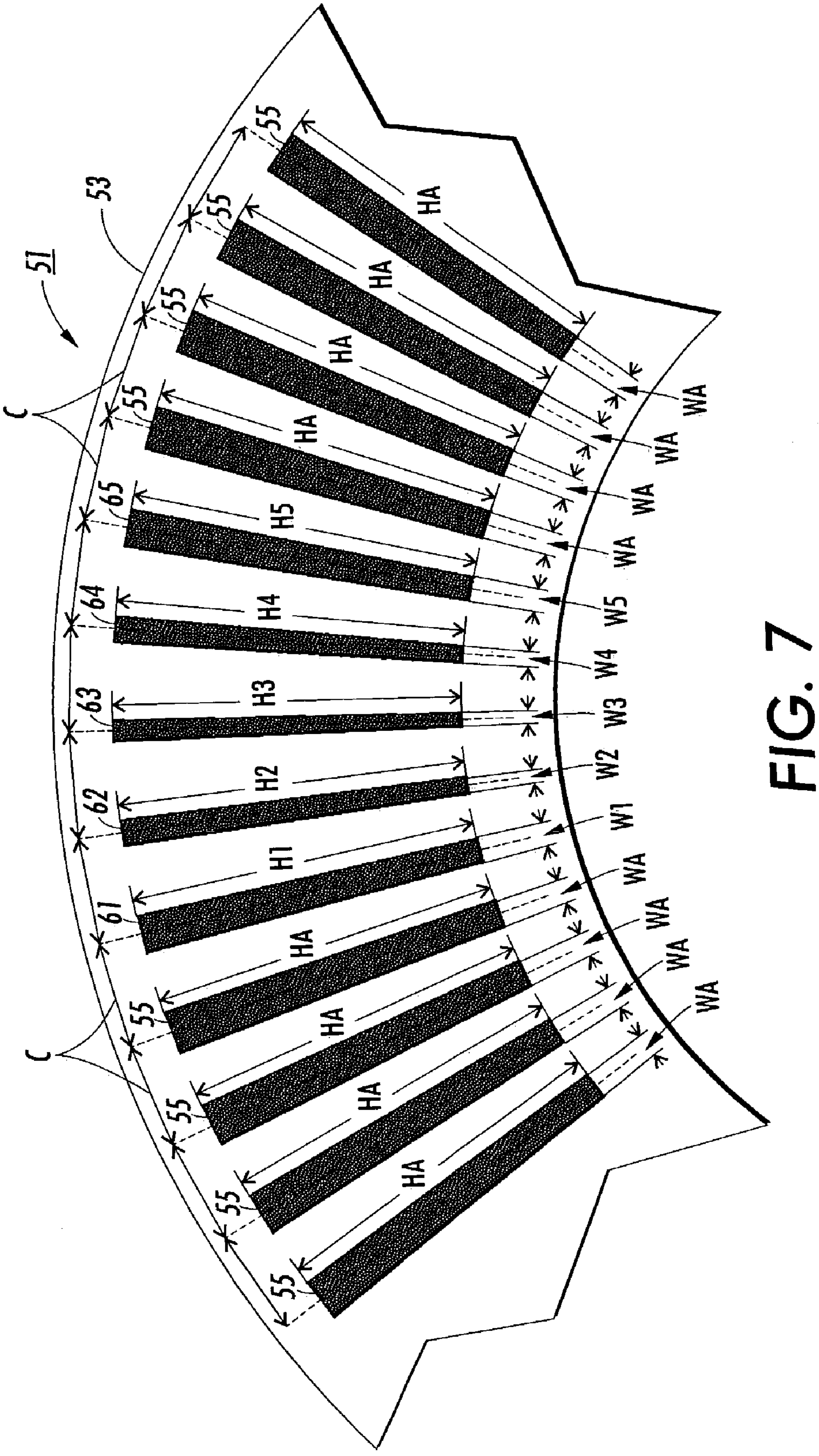
FIG. 7 is a schematic illustration of an embodiment of a circular optical grating.

For example, as schematically depicted in FIGS. 7 and 8, the dark areas 61–65 can be narrower than the dark areas 55 which can be of substantially identical width. Alternatively, the dark areas 61–65 can be wider than the dark areas 55 which can be of substantially identical width or thickness.

Figure 9:
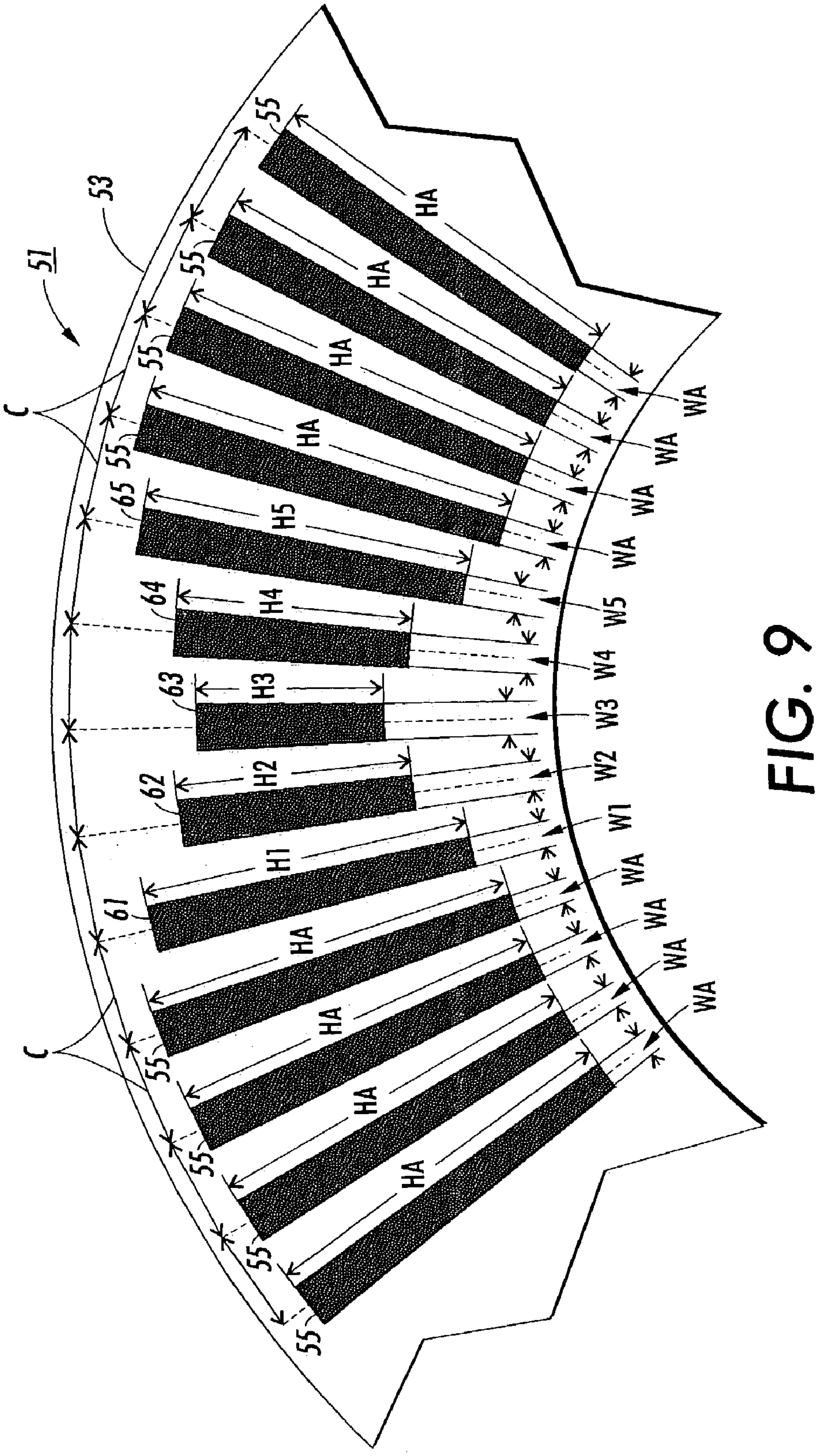
FIG. 9 is a schematic illustration of, an embodiment of yet another circular optical grating.

As another example, as schematically depicted in FIG. 9, the dark areas 61–65 can be shorter than the dark areas 55, wherein the dark areas 55, 61–65 can be of substantially the same angular width, and wherein the radial heights of the dark areas 61–65 are less than the radial height of the field of view of the quadrature optical encoder sensor 119. That is, the radial heights of the dark areas 55, 61–65 are configured such that the quadrature optical encoder can see the differences in radial height. As yet another example, the radial heights of the dark areas 61–65 can be greater than the radial heights of the dark areas 55 which can be of substantially identical radial height.

Figure 10:
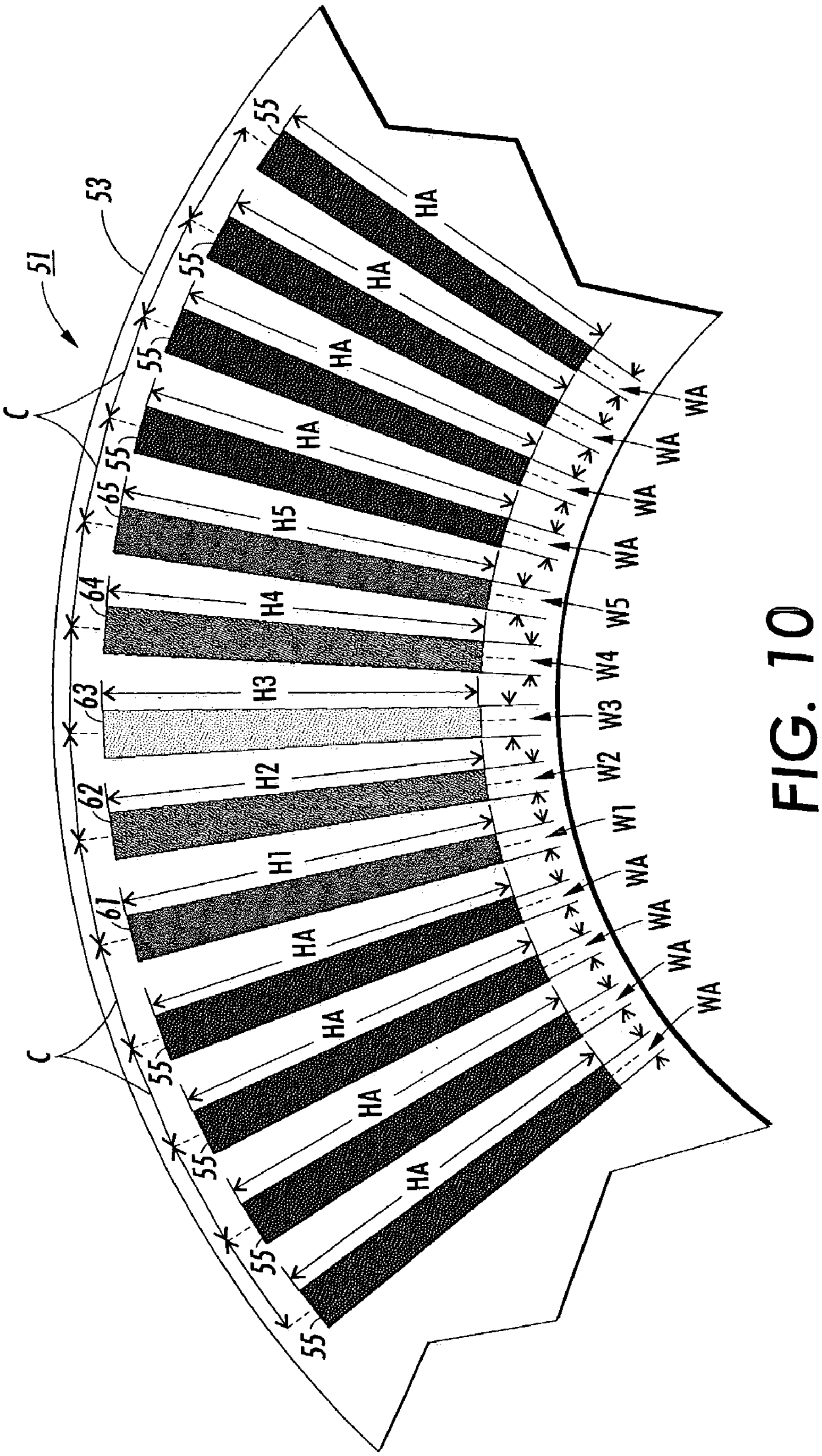
FIG. 10 is a schematic illustration of a further circular optical grating.

As yet another example, as schematically depicted in FIG. 10, each of the dark areas 61–65 can be of lighter shades of gray than the dark areas 55 which can be of substantially the same shade of gray such that the dark areas 61–65 have greater reflectance (in a reflective system) or transmissivity (in a transmissive system). Alternatively, each of the dark areas 61–65 can be of darker shades of gray than the dark areas 55 so as to have less reflectance (in a reflective system) or transmissivity (in a transmissive system). Also, the dark areas 61–65 can have a different pattern or patterns than dark areas 55, such that the dark areas 61–65 can have a greater reflectance (in a reflective system) or transmissivity (in a transmissive system) than the dark areas 55, or less reflectance (in a reflective system) or transmissivity (in a transmissive system) than the dark areas 55.

Effectively, the optical characteristics of each of the dark areas 61–65, 55 is configured to achieve a desired change in amplitude of the quadrature output waveforms of the quadrature optical encoder sensor 19 when the dark areas 61–65 are sensed. It should be appreciated that the various techniques for changing the optical characteristics of the dark areas can be employed individually or in combination.

Relative to the foregoing linear and circular optical tracks, the change in optical characteristics of the dark areas 61–65 can be abrupt or gradual over the span of the dark areas 61–65. For example, the widths of the dark areas 61–65 can be substantially identical. As another example, the widths of the dark areas 61–65 can decrease and then increase, whereby the dark area 63 is the narrowest. Similarly, the widths of the dark areas 61–65 can increase and then decrease such that the dark area 63 is the widest of the dark areas 61–65.

By way of illustrative example, the widths of the dark areas 55 can be about 50 percent of the pitch C, and the dark areas 61–65 can decrease to a width of about 30 percent of the pitch C. Also by way of illustrative example, the optically different dark areas 61–65 can comprise 74 bars arranged as follows, for example in a left to right or clockwise direction: 30 bars that decrease in width, 14 central bars having a width of about 30 percent of the pitch C, and 30 bars that increase in width.

The invention has been described with reference to disclosed embodiments, and it will be appreciated that variations and modifications can be effected within the spirit and scope of the invention.

What is claimed is:

1. A printing apparatus comprising:

a print mechanism having a movable component;

an optical grating for modulating a beam of light;

a sensor for sensing modulated light provided by the optical grating;

the optical grating and the sensor being movable relative to each other pursuant to movement of the movable component; and the optical grating including an optical track comprising a series of contiguously adjacent encoder bars that are substantially uniformly spaced center to center so as to have substantially uniform pitch, the series of contiguously adjacent bars including (a) a plurality of contiguously adjacent first encoder bars of respective first encoder bar widths and (b) a plurality of second encoder bars of a substantially constant second encoder bar width, wherein the contiguously adjacent first encoder bars and the second encoder bars have non-linear sides, and wherein each of the first encoder bar widths is different from the substantially constant second encoder bar width.

2. The printing apparatus of claim 1 wherein the movable component comprises a print drum and further including an ink jet marking system.

3. The printing apparatus of claim 1 wherein the movable component comprises an ink jet printhead and further including a supply of solid ink that is melted and provided to the ink jet printhead.

4. The printing apparatus of claim 1 wherein the movable component comprises a print drum and further including an electrophotographic marking system.

5. The printing apparatus of claim 1 wherein the contiguously adjacent first encoder bars are narrower than the second encoder bars.

6. The printing apparatus of claim 1 wherein the contiguously adjacent first encoder bars are narrower than the second encoder bars and are of gradually changing width.

7. The printing apparatus of claim 1 wherein the contiguously adjacent first encoder bars are wider than the second encoder bars.

8. The printing apparatus of claim 1 wherein the contiguously adjacent first encoder bars are wider than the second encoder bars and are of gradually changing width.

9. The printing apparatus of claim 1 wherein the plurality of second encoder bars are disposed on both sides of the contiguously adjacent first encoder bars.

* * * * *